Aug. 29, 1933.  J. RUTHS  1,925,078
POWER PLANT
Filed March 28, 1931
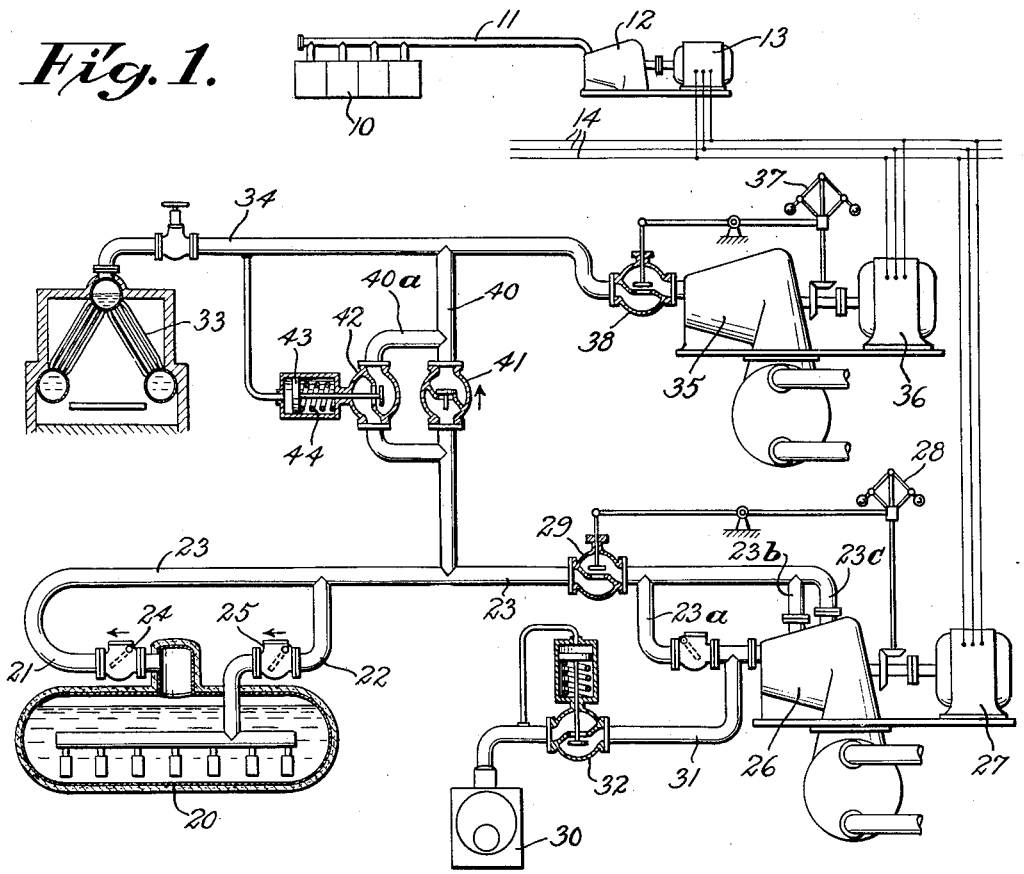
Fig. 1.
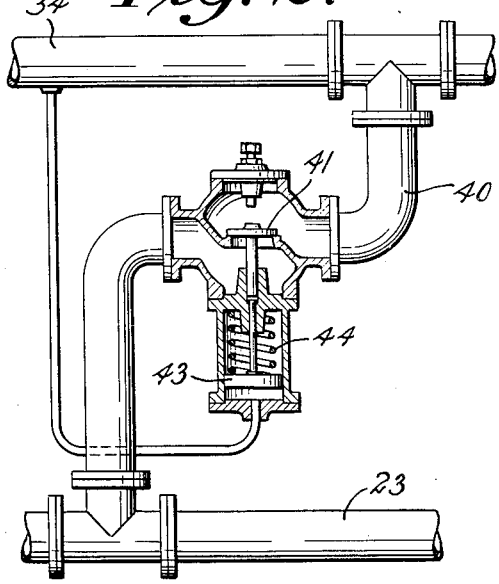
Fig. 2.
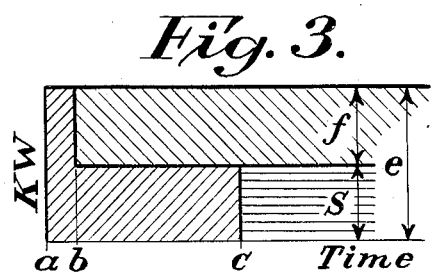
Fig. 3.
Fig. 4.
INVENTOR
Johannes Ruths
BY
Wm T Hedlund
his ATTORNEY Patented Aug. 29, 1933

1,925,078

UNITED STATES PATENT OFFICE 1,925,078

POWER PLANT

Johannes Ruths, Djursholm, Sweden

Application March 28, 1931, Serial No. 525,948
and in Germany April 5, 1930

7 Claims. (Cl. 60—94)

My invention relates to steam power plants and more particularly to reserve or stand-by plants which operate to automatically take over the load of a power station or section thereof when there is an interruption or breakdown of the main power-producing mechanism or distribution apparatus. Plants of this type generally comprise a steam accumulator, a turbo-electric unit driven by accumulator steam, a live-steam turbine, together with a reserve steam generator for supplying steam to the live-steam turbine. In such plants the general method of operation upon a disturbance in the primary installation is to supply the accumulator-turbine with accumulator-steam while the reserve steam generator is being heated, the live-steam turbine being idle or running on the line until steam is up to pressure in the steam generator. The accumulator and the accumulator-turbine should have a capacity sufficient to take care of the complete load during the period in which the steam generator is being brought up to operating condition. When the steam generator has been brought up to operating condition and supplies steam to the live-steam turbine, the accumulator and the accumulator-turbine are again cut out of service.

The present invention has for one object to provide apparatus for such a reserve plant capable of appreciably increasing its capacity at the time when the disturbance occurs in the primary installation. In accordance with the invention, when the disturbance necessitating the coupling in the reserve plant begins, not alone is steam supplied from the accumulator to the accumulator-turbine, but steam is also supplied from the accumulator to the live-steam turbine.

The invention will be explained in detail with reference to the accompanying drawing showing more or less diagrammatically a steam plant embodying the invention, which drawing is to be considered as a part of this specification, and on which:

Fig. 1 is a more or less diagrammatic layout view of a steam plant embodying the invention;

Fig. 2 shows two of the valves of Fig. 1 united in a common valve structure;

Fig. 3 is a diagram of steam quantity; and

Fig. 4 is a diagram of steam pressure.

Referring to Fig. 1, reference character 10 designates the main or primary boiler plant supplying steam through conduit 11 to the main turbine or turbines 12 driving the generator or generators 13. Electricity produced is distributed in the electric main 14. This plant is the normal operatitng plant. The remainder of Fig. 1 is the reserve plant.

The reserve plant comprises an accumulator 20, which may be of the kind disclosed in my U. S. Patent No. 1,585,790, granted May 25, 1926. The accumulator is connected by conduits 21 and 22 to an accumulator-steam conduit 23. Check valves 24 and 25 are interposed in conduits 21 and 22, permitting flow of steam in the direction indicated by the arrows.

An accumulator-prime-mover, preferably a turbine 26, is connected to receive accumulator-steam from conduit 23. Turbine 26 drives an electric generator 27, electrically coupled to the electric main 14. As is customary, the electric current produced is to be considered as alternating current. Consequently, generator 27 may run synchronously on the line without supplying electricity thereto. A speed governor 28 driven from the shaft of the turbo-generator set 26—27 controls a valve 29 in conduit 23 and acts to open the valve more or less on decrease of speed and to close the valve more or less on increase of speed. Assuming that the speed of turbine 12 is automatically controlled at 3,600 R. P. M., governor 28 may be advantageously adjusted to open valve 29 at some lower value as, for instance, 3,400 R. P. M. Branch conduits $23a$, $23b$ and $23c$ may be used to supply the steam to different points of turbine 26 in accordance with known practice. There may be several turbines 26.

Connected to the inlet of the turbine 26 ahead of the high pressure wheel is a reserve boiler 30 supplying steam through the conduit 31 in which is interposed an overflow valve 32, which operates to maintain a constant pressure in boiler 30 and to prevent flow of steam from this boiler to the turbine so long as the pressure in the boiler is below a predetermined value.

The reserve plant also includes a live-steam reserve boiler 33, which is the principal or initial boiler of the reserve plant. There may be several boilers 33. This boiler is preferably of the small water content type in which steam may be produced very quickly after the fire is started. Boiler 30, on the other hand, may be a relatively large water content boiler, requiring a longer time to fire up. It will be understood that both boilers 30 and 33 are heated by such means as oil burners or other heating means, whereas the accumulator 20 is essentially an unheated insulated receptacle in which steam is stored by being introduced thereinto and condensed in water of approximately boiling temperature.

Steam passes from boiler 33 through a live-steam conduit 34 and to the live-steam-prime-mover 35 which, as above stated, is also a reserve unit. This prime-mover is also preferably a turbine. It drives an electric generator 36, also coupled to electric main 14. A speed governor 37 controls a valve 38, which determines the supply of steam to the prime-mover. Governor 37 may be adjusted in manner similar to governor 28. Turbines 26 and 35 may even be on the same shaft.

Between live-steam conduit 34 and accumulator-steam conduit 23 is a connection 40 including a branch 40a. A check valve 41 is interposed in connection 40, and branch 40a is connected around check valve 41. An overflow valve 42 is interposed in branch connection 40a. This overflow valve is responsive to the pressure in conduit 34 and consequently to the pressure in boiler 33. A rise of this pressure acts against piston 43 to open the valve more or less. A decrease of pressure permits spring 44 to close the valve more or less. Check valve 41 is constructed to permit flow of steam only in the direction of the arrow. When the steam pressure is higher in conduit 23 than in conduit 34, there will be a flow of steam through connection 40 from conduit 23 to conduit 34. When the pressure is higher in conduit 34 than in conduit 23, check valve 41 closes. Connection 40 is then closed until such time as the pressure in conduit 34 rises above a relatively high predetermined value, whereupon overflow valve 42 is opened to let the surplus steam generated in boiler 33 pass to the accumulator 20.

In Fig. 2, the check valve 41 and the overflow valve are combined in a single valve structure. As long as the pressure in conduit 34 is below a predetermined high value, the piston 43 has no effect on the valve 41, but when the pressure rises in conduit 34 above a predetermined value overcoming spring 44, piston 43 is moved to open valve 41 regardless of the pressure differential on the two sides of the check valve 41.

The operation of the above described plant is illustrated in Figs. 3 and 4. In both these figures time is designated horizontally. Assume that at time *a* there is a breakdown or disturbance in the primary plant 10—13. At this time neither boiler 33 nor boiler 30 is capable of delivering any steam. All the turbines are running synchronously and their speed decreases. When the speed decreases to a value of, for example, 3,400 R. P. M., governors 28 and 37 open valves 29 and 38. Steam then passes from the accumulator 20 both to turbines 26 and 35. Since the pressure is low in conduit 34, the pressure in conduit 23 is higher and steam passes through check valve 41 to the live-steam-prime-mover 35 from the accumulator as well as to the accumulator-prime-mover 26. The energy supply of the accumulator during this initial period is represented by the total k. w. output *e* multiplied by the time *a—b*. During this time the boiler 33 is being fired and is brought up to capacity so that it can supply steam. As soon as this boiler supplies steam to conduit 34 of higher pressure than the steam pressure in the accumulator, which has dropped as indicated in Fig. 4, check valve 41 closes and steam is then supplied in parallel, on the one hand from boiler 33 to turbine 35, and on the other hand from accumulator 20 to turbine 26. The output of the boiler 33 is represented by the cross-hatched surface in Fig. 3 having the vertical line *f* therein. The accumulator pressure then drops more gradually, as indicated between time *b* and *c* in Fig. 4. During this time the boiler 30 is being fired and is brought up to pressure at time *c*. The accumulator after time *c* is no longer operating and the power is supplied by the two boilers 30 and 33. The output of boiler 30 is indicated by the horizontal cross-hatched surface in Fig. 3 for the vertical line *s* therein. The accumulator has then reached its low pressure point indicated to the right of *c* in Fig. 4. Whether the boiler 30 is used or not depends, of course, on the extent of time of the disturbance and whether the load is so great that the steam plant represented by 33 cannot take care of all the load. After the time *c* has been reached, the accumulator can be charged by generating more steam in boiler 33 than is necessary for turbine 35, the surplus passing through the overflow valve 42 and increasing the pressure in the accumulator.

By means of the present invention it is possible to have a greater capacity at the moment of disturbance in an accumulator reserve plant for a given turbine aggregate or it is possible to decrease the turbine capacity.

To illustrate, in a reserve plant having an accumulator of 6,000 cubic meters volume and having accumulator-turbines of 50,000 k. w. and live-steam turbines of 50,000 k. w., it is possible to provide 100,000 k. w. from the accumulator for a period of ten minutes with a pressure drop in the accumulator from 13 to 10 atmospheres. It will thus be seen that double the accumulated capacity can be expended at the time of the disturbance than with the arrangement of the prior art.

What I claim is:

1. In combination with a main power plant including a prime-mover, a reserve power plant comprising a steam accumulator, an accumulator-prime-mover, means to conduct steam from said accumulator to said accumulator-prime-mover, a boiler, a live-steam-prime-mover, means to conduct steam from said boiler to said live-steam-prime-mover, and means to conduct steam from said accumulator to said live-steam-prime-mover while steam is flowing from the accumulator to the accumulator-prime-mover.

2. In combination with a main power plant including a prime-mover, a reserve power plant comprising a steam accumulator, an accumulator-prime-mover, means to conduct steam from said accumulator to said accumulator-prime-mover, a boiler, a live-steam-prime-mover, means to conduct steam from said boiler to said live-steam-prime-mover, and means to automatically conduct steam from said accumulator to said live-steam-prime-mover when the pressure in the accumulator is higher than the pressure in said boiler while steam is flowing from the accumulator to the accumulator-prime-mover.

3. In combination with a main power plant including a prime-mover, a reserve power plant comprising a steam accumulator, an accumulator-prime-mover, an accumulator-steam conduit for conducting steam from said accumulator to said accumulator-prime-mover, a live-steam boiler, a live-steam-prime-mover, a live-steam conduit for conducting steam from said boiler to said live-steam-prime-mover, a connection between said live-steam conduit and said accumulator-steam conduit, and means in said connection for permitting flow of steam from said accumulator-steam conduit to said live-steam conduit while steam is flowing from the accumulator to the accumulator-prime-mover.

4. In combination with a main power plant including a prime-mover, a reserve power plant comprising a steam accumulator, an accumulator-prime-mover, an accumulator-steam conduit for conducting steam from said accumulator to said accumulator-prime-mover, an inlet connection for said accumulator, a check valve in said inlet connection, said inlet connection being connected to said accumulator-steam conduit, an outlet connection for said accumulator connected to said accumulator-steam conduit, a check valve in said outlet connection, a live-steam boiler, a live-steam-prime-mover, a live-steam conduit for conducting steam from said boiler to said live-steam-prime-mover, a connection between said live-steam conduit and said accumulator-steam conduit, and means in said connection for permitting flow of steam from the accumulator-steam conduit to the live-steam conduit when the pressure in the accumulator-steam conduit is higher than the pressure in the live-steam conduit and while steam is flowing from the accumulator to the accumulator-prime-mover.

5. In combination with a main power plant including a prime-mover, a reserve power plant comprising a steam accumulator, an accumulator-prime-mover, an accumulator-steam conduit for conducting steam from said accumulator to said accumulator-prime-mover, an inlet connection for said accumulator connected to said accumulator-steam conduit, a check valve in said inlet connection, an outlet connection for said accumulator connected to said accumulator-steam conduit, a check valve in said outlet connection, a live-steam boiler, a live-steam-prime mover, a live-steam conduit for conducting steam from said boiler to said live-steam-prime-mover, a connection between said live-steam conduit and said accumulator-steam conduit, and check valve mechanism in said connection for permitting flow of steam from the accumulator-steam conduit to the live-steam conduit while steam is flowing from the accumulator to the accumulator-prime-mover.

6. In combination with a main power plant including a prime-mover, a reserve power plant comprising a steam accumulator, an accumulator-prime-mover, an accumulator-steam conduit for conducting steam from said accumulator to said accumulator-prime-mover, an inlet connection for said accumulator connected to said accumulator-steam conduit, a check valve in said inlet connection, an outlet connection for said accumulator connected to said accumulator-steam conduit, a check valve in said outlet connection, a live-steam boiler, a live-steam-prime-mover, a live-steam conduit for conducting steam from said boiler to said live-steam-prime-mover, a connection between said live-steam conduit and said accumulator-steam conduit, check valve mechanism in said connection tending to permit flow of steam from the accumulator-steam conduit to the live-steam conduit while steam is flowing from the accumulator to the accumulator-prime-mover and to prevent flow of steam from the live-steam conduit to the accumulator-steam conduit, and overflow mechanism permitting flow of steam from the live-steam conduit to the accumulator-steam conduit when the pressure in the live-steam conduit exceeds a predetermined value.

7. In combination with a main power plant including a prime-mover, a reserve power plant comprising a steam accumulator, an accumulator-prime-mover, an accumulator-steam conduit for conducting steam from said accumulator to said accumulator-prime-mover, an inlet connection for said accumulator connected to said accumulator-steam conduit, a check valve in said inlet connection, an outlet connection for said accumulator connected to said accumulator-steam conduit, a check valve in said outlet connection, a live-steam boiler, a live-steam-prime-mover, a live-steam conduit for conducting steam from said boiler to said live-steam-prime-mover, a connection between said live-steam conduit and said accumulator-steam conduit, means in said connection for permitting flow of steam from the accumulator-steam conduit to the live-steam conduit while steam is flowing from the accumulator to the accumulator-prime-mover, and a boiler for supplying steam to the accumulator-prime-mover.

JOHANNES RUTHS.